Dec. 12, 1933.  F. E. LOUDY  1,939,558
AIRCRAFT STRUCTURE
Filed Aug. 13, 1930
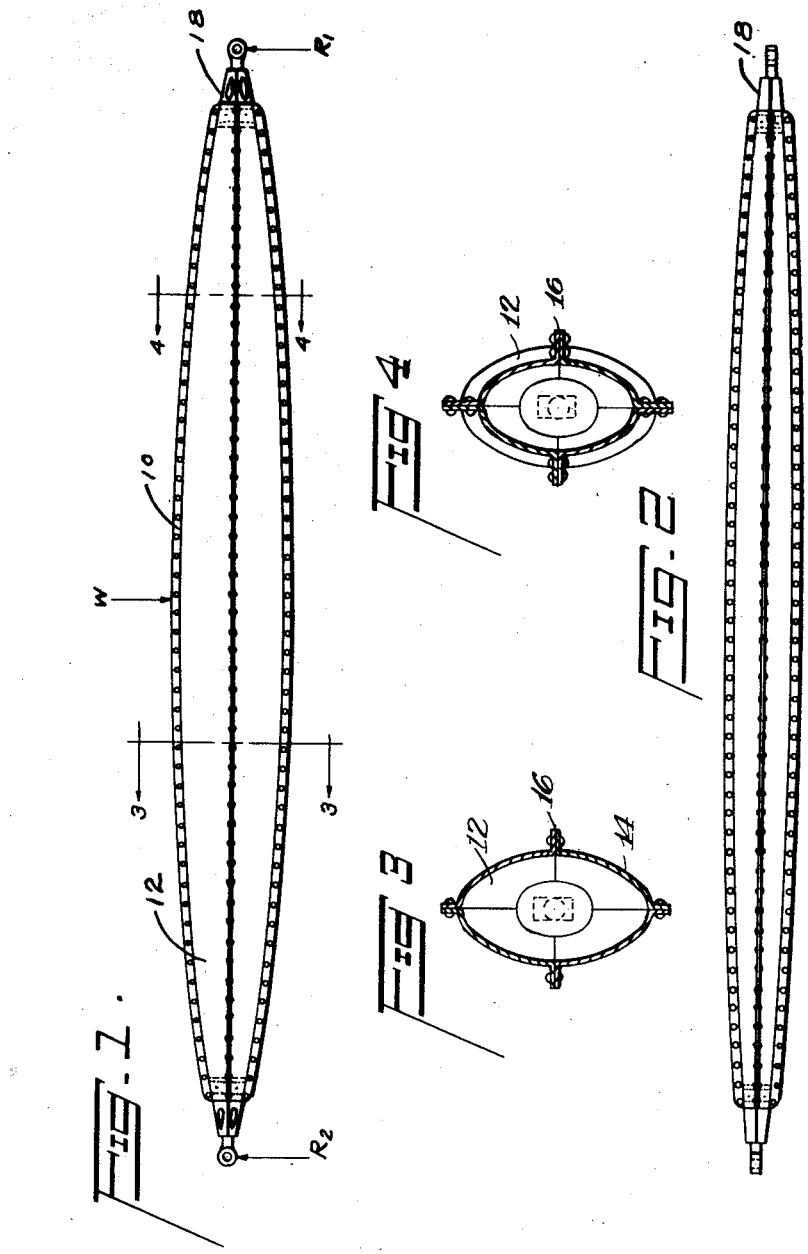
INVENTOR
FLAVIUS E LOUDY
BY Robert H. Young
ATTORNEY Patented Dec. 12, 1933

1,939,558

UNITED STATES PATENT OFFICE 1,939,558

AIRCRAFT STRUCTURE

Flavius E. Loudy, Akron, Ohio

Application August 13, 1930. Serial No. 475,055

6 Claims. (Cl. 189—37)

This invention relates to structures and more particularly to a structure element designed to be used in the construction of airship keels, hulls, etc.

This invention has for its primary object to provide a novel structure element such that it possesses a relatively high strength-weight ratio for combined axial and transverse loads.

It is well known that heretofore hollow columns were employed to take axial loads solely, but where loads were applied in addition to the axial loads it was necessary to reinforce the column in the plane of the transverse loads by the addition of other structural elements, thereby increasing the weight of the column and reducing the strength-weight ratio. According to applicant's invention the use of additional structural elements in connection with hollow columns for reinforcing the same against transverse loads has been eliminated by making a hollow column of a simple construction having a substantially elliptical cross section and disposing the major axis of the column in the plane of the transverse loads thereby obtaining a higher strength-weight ratio than was heretofore possible with columns of this type.

Fig. 1 is a side elevational view of a hollow column embodying applicant's invention with its major axis disposed in a vertical plane.

Fig. 2 is a side elevational view of the column shown in Fig. 1 with its minor axis disposed in a vertical plane.

Figs. 3 and 4 are cross sectional views taken on the lines 3—3 and 4—4 respectively of Fig. 1.

As shown in Figs. 3 and 4 the column 10 has an elliptical cross section and tapers along its longitudinal axis from the center portion towards its ends to provide a column of uniform strength for transverse and axial loads. The difference between the length of the major and minor axes is determined by the relative magnitudes of the transverse and axial loads. This column may be made from any number of segments 12, but preferably it is constructed from four segments. Each segment 12 has a central curved portion 14 with outwardly flanged edges 16 that are secured together in any suitable manner such as by means of rivets to form four longitudinal ribs on the column. Each end of the column is provided with a conical strut end 18 or any other type of strut end connections.

The device herein shown and described is only illustrative of my invention, it being expressly understood that various modifications in the pillar construction may be made by those skilled in the art without departing from the spirit of the invention.

Having thus fully described my invention, what I claim as new and desire to secure by Letters Patent is:—

1. A structure element adapted to be subjected to axial and transverse loads being elliptical in cross section throughout its length, and tapering from its central portion to its ends to provide a column of substantially uniform strength.

2. A structure element adapted to be subjected to axial and transverse loads, being elliptical in cross section throughout its length, and tapering towards its ends from the center of effort of the transverse load.

3. A hollow structure comprising a plurality of longitudinal sections secured together and adapted to be subjected to axial and transverse loads, said structure being elliptical in cross section throughout its length, and tapering towards its ends from the center of effort of the transverse load.

4. In an aircraft structure a hollow structure comprising a plurality of longitudinal sections of uniform thickness secured together, said structure being elliptical cross section throughout its entire length and tapering from its central portion towards its ends, said element having its major axis disposed in the plane of the transverse loads of the aircraft structure.

5. A structure element for aircraft being elliptical in cross section throughout its length and adapted to be subjected to combined axial and transverse loads, said element tapering from the center of effort of the transverse load and having its major axis disposed in the plane thereof.

6. A hollow structure for aircraft fabricated from a plurality of longitudinal sections, each section being provided with projecting flanges, the adjacent flanges of said sections being secured together throughout their entire length, said structure being elliptical in transverse cross-section and having its major axis disposed in the plane of the maximum transverse load of said aircraft.

FLAVIUS E. LOUDY.